(12) United States Patent
Miller et al.

(10) Patent No.: US 8,162,377 B2
(45) Date of Patent: Apr. 24, 2012

(54) ROLLING TARP SYSTEM

(75) Inventors: James C. Miller, Boise, ID (US);
Michael R. Hunter, Boise, ID (US)

(73) Assignee: Trinity Trailer Mfg., Inc., Boise, ID (US)

( * ) Notice: Subject to any disclaimer, the term of this patent is extended or adjusted under 35 U.S.C. 154(b) by 315 days.

(21) Appl. No.: 12/537,247

(22) Filed: Aug. 6, 2009

(65) Prior Publication Data
US 2010/0032978 A1 Feb. 11, 2010

Related U.S. Application Data

(60) Provisional application No. 61/086,508, filed on Aug. 6, 2008.

(51) Int. Cl.
*B60P 7/04* (2006.01)
(52) U.S. Cl. .................. 296/98; 296/100.11; 296/100.14
(58) Field of Classification Search .................... 296/98, 296/100.11–100.18; 160/120, 243, 310
See application file for complete search history.

(56) References Cited

U.S. PATENT DOCUMENTS

| | | | |
|---|---|---|---|
| 4,230,360 A | 10/1980 | Eisenman | |
| 4,691,957 A | 9/1987 | Ellingson | |
| 5,259,659 A | 11/1993 | Inaba | |
| 5,482,347 A | 1/1996 | Clarys et al. | |
| 5,658,037 A * | 8/1997 | Evans et al. | 296/98 |
| 5,762,002 A | 6/1998 | Dahlin et al. | |
| 5,911,467 A | 6/1999 | Evans et al. | |
| 5,924,758 A | 7/1999 | Dimmer et al. | |
| 6,142,553 A | 11/2000 | Bodecker | |
| 6,575,518 B1 | 6/2003 | Henning | |
| 6,595,594 B2 | 7/2003 | Royer | |
| 6,805,395 B2 | 10/2004 | Royer | |
| 6,860,310 B2 | 3/2005 | Kubly et al. | |
| 6,886,879 B2 * | 5/2005 | Nolan et al. | 296/100.12 |
| 6,926,337 B2 * | 8/2005 | Poyntz | 296/98 |
| 7,152,653 B1 * | 12/2006 | Kubly et al. | 160/120 |
| 7,188,887 B1 * | 3/2007 | Schmeichel | 296/98 |
| 7,726,720 B2 * | 6/2010 | Searfoss | 296/100.01 |
| 2010/0032978 A1 * | 2/2010 | Miller et al. | 296/98 |

OTHER PUBLICATIONS

Photo of Prior Art: Low-Sided Trinity Trailer TM (Boise, Idaho) Truck/Trailer into which Silage is being blown; 2007.

* cited by examiner

*Primary Examiner* — Glenn Dayoan
*Assistant Examiner* — Gregory Blankenship
(74) *Attorney, Agent, or Firm* — Pedersen and Company, PLLC; Ken J. Pedersen; Barbara S. Pedersen

(57) ABSTRACT

A tarp bar may be an alignment member, a reinforcement member, and a furling control member, without adding substantial weight or complexity to a rolling tarp system. The tarp bar is fixed to the tarp a significant distance from the drive bar and is not motorized or otherwise powered, and is preferably attached only to the tarp material, parallel to the length of the tarp and the bed/trailer. The tarp bar is recessed or otherwise-concave along its length to allow cradling of, and hence parallel orientation of, an already-rolled portion of the tarp. The tarp bar is preferably broader than said already-rolled portion, so that two opposing edges of the tarp bar extend out beyond the diameter of the already-rolled portion so that the combination of the already-rolled portion received in the tarp bar is a non-cylindrical unit. Subsequent rolling-up of the tarp tends to occur in incremental, partial-rotation steps in a cam-like action that maintains more consistent tension all along the length of the tarp, to form a tighter and more even roll along the entire length of the roll.

23 Claims, 17 Drawing Sheets

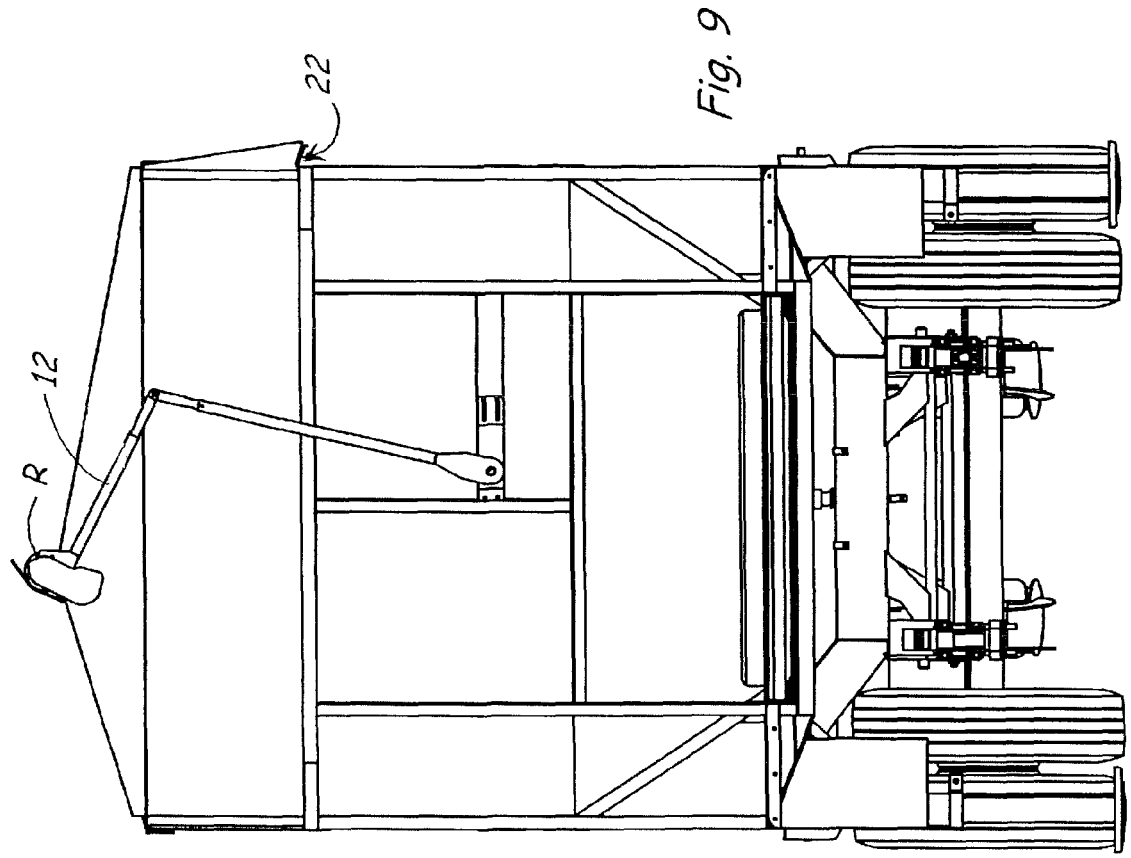

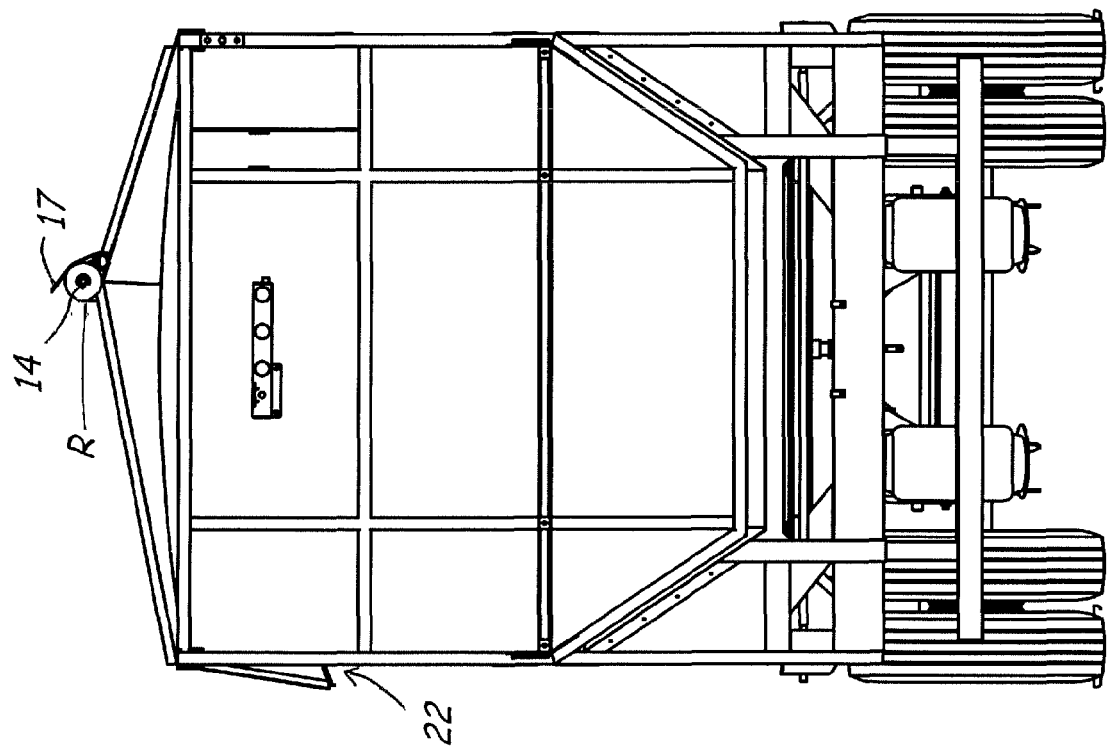

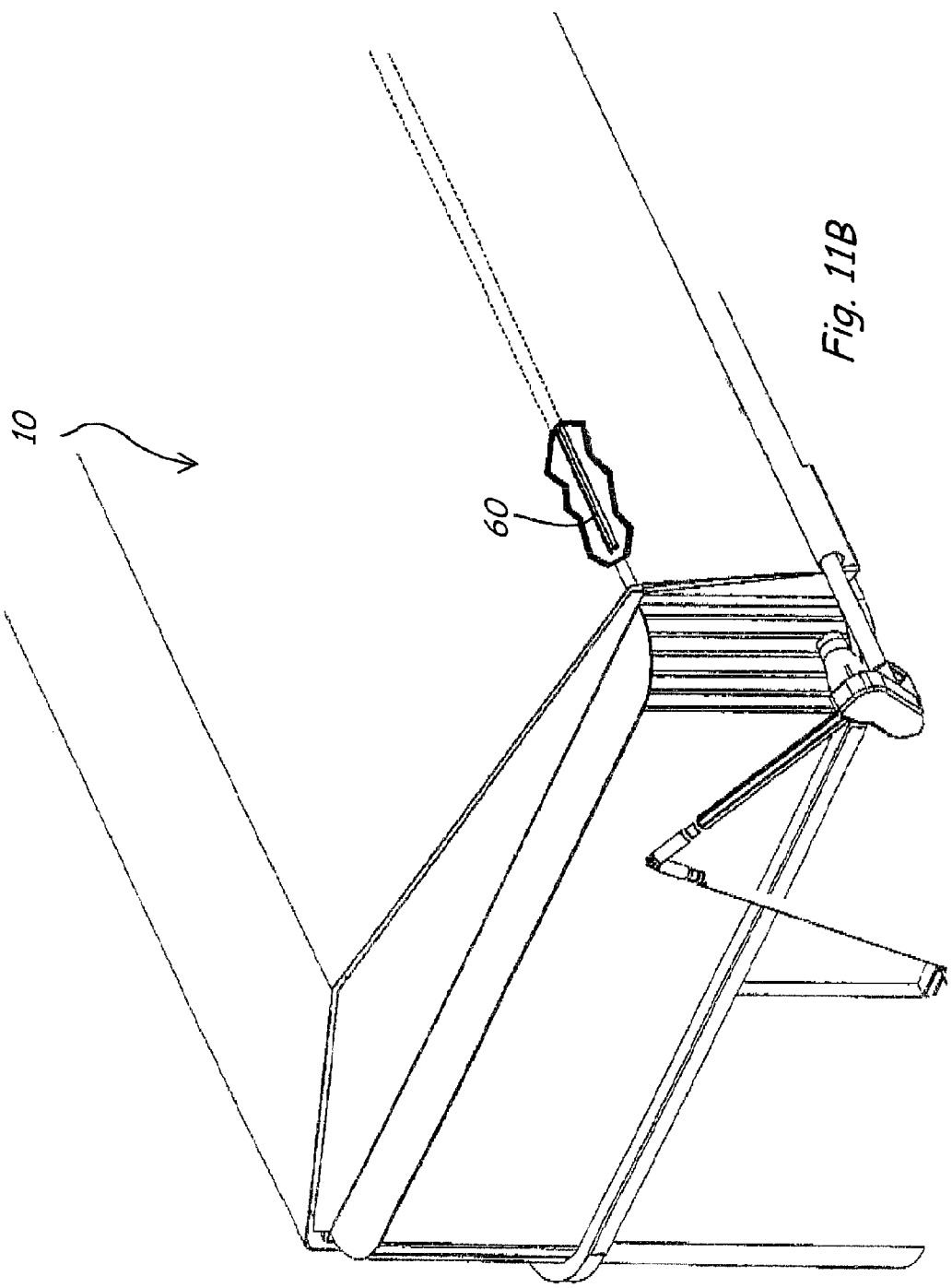

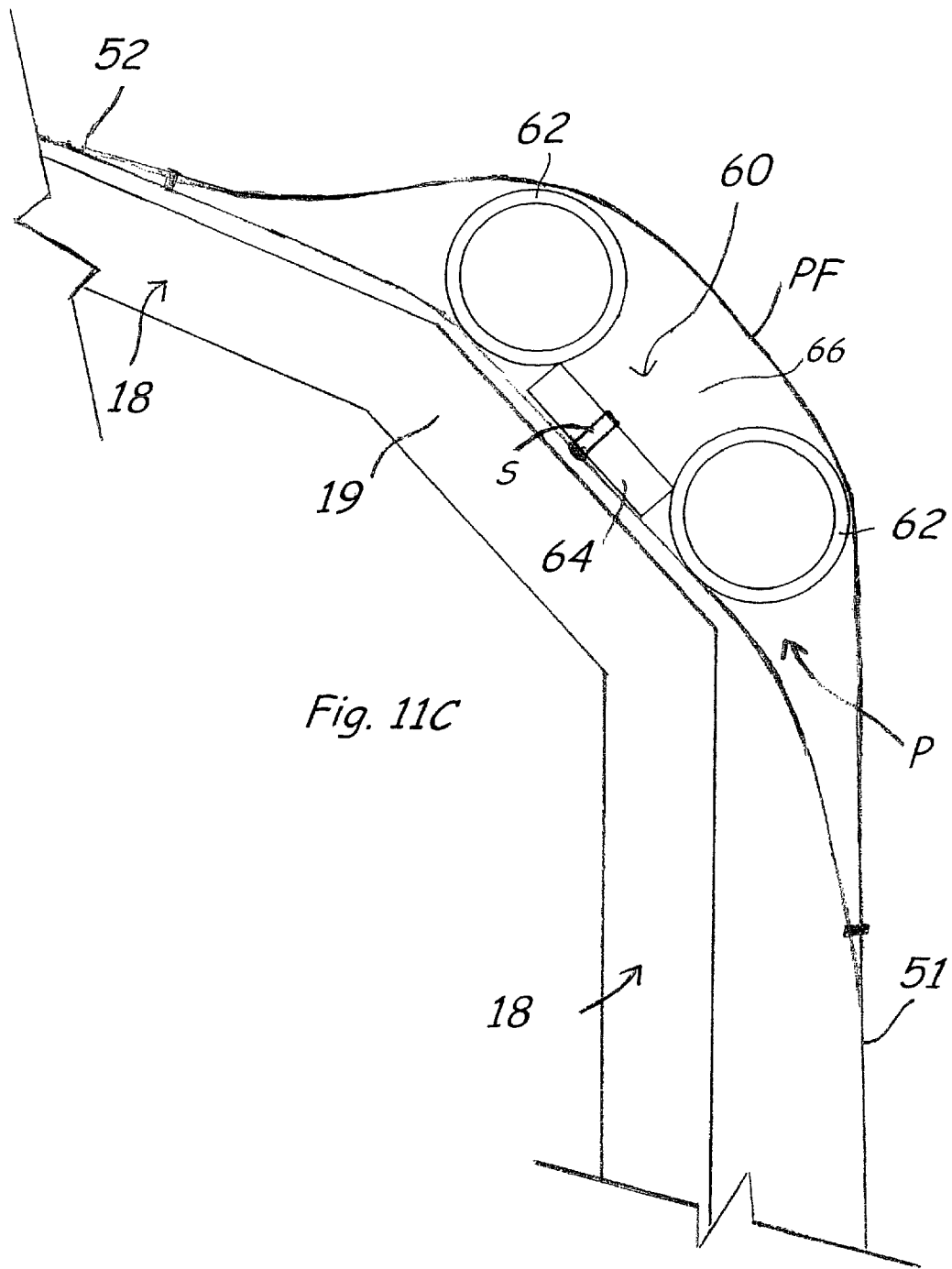

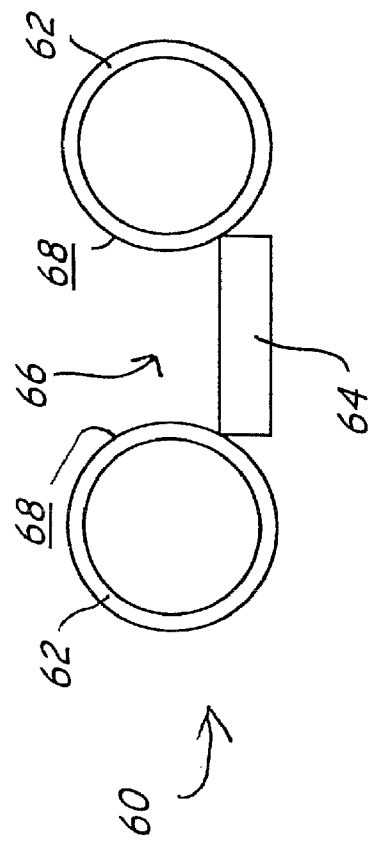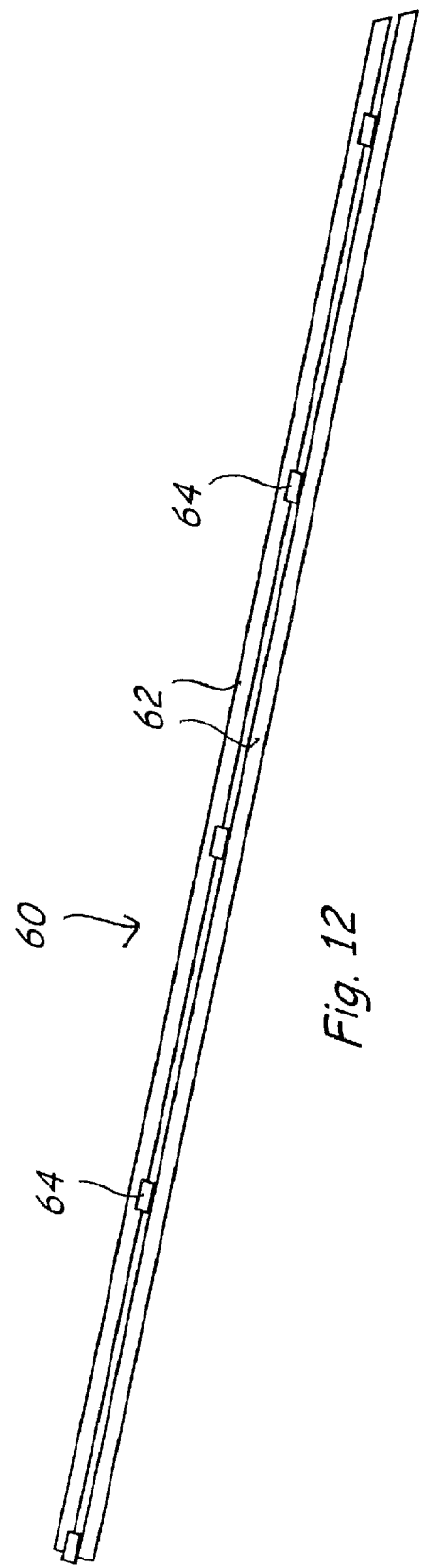
Fig. 13
Fig. 12

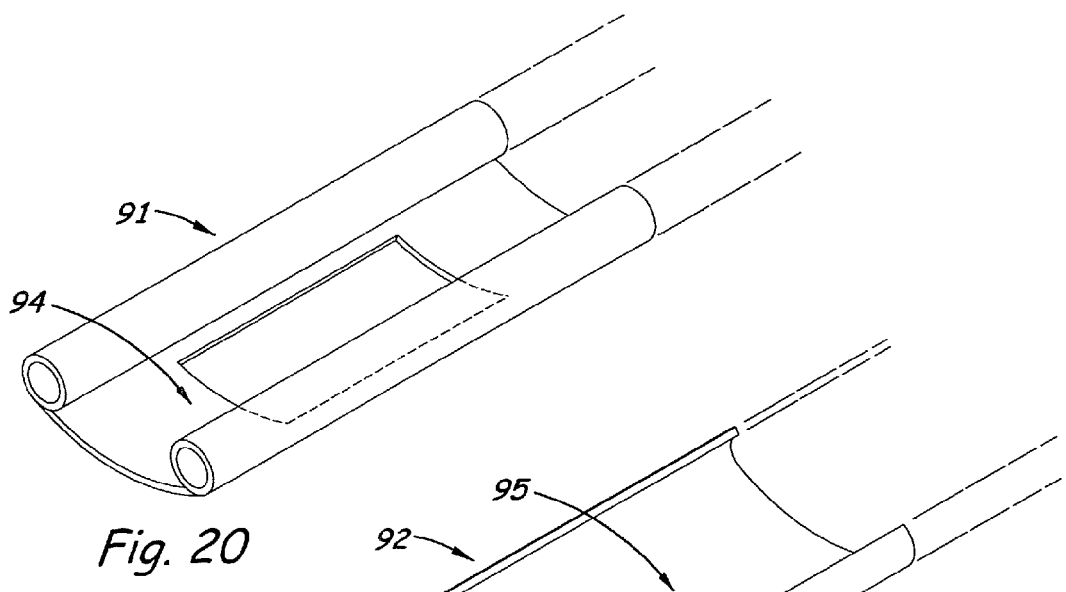
Fig. 20
Fig. 21
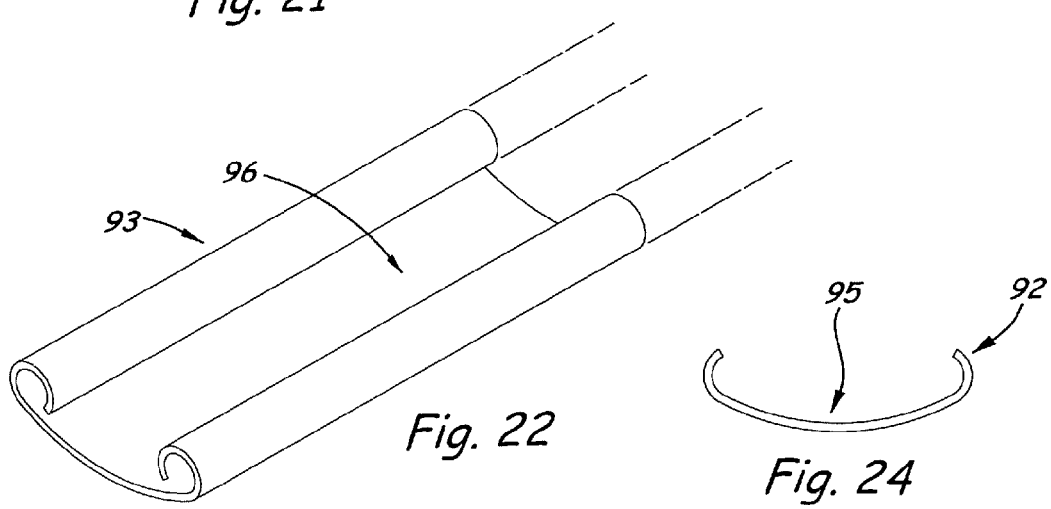
Fig. 22
Fig. 24
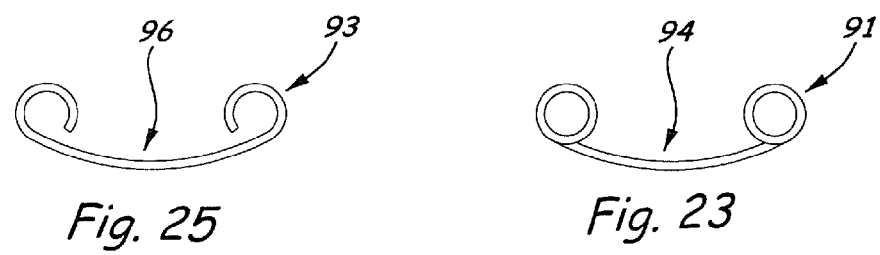
Fig. 25
Fig. 23

ROLLING TARP SYSTEM

This application claims benefit of Provisional Application Ser. No. 61/086,508, filed Aug. 6, 2008, the entire disclosure of which is incorporated herein by this reference.

BACKGROUND OF THE INVENTION

1. Field of the Invention

The invention relates generally to rolling tarp systems, and, more specifically, to rolling tarp systems provided on trucks or trailers transporting cargo to be covered with the tarp. Preferred embodiments comprise a bar system that is added to a rolling tarp that improves the consistency and effectiveness of the rolling process.

2. Related Art

Conventional truck beds or trailers for hauling of farm products or other bulk cargo are frequently equipped with a tarp adapted to cover the open top of the bed or trailer. The tarp may prevent significant loss of cargo during travel at highway speeds, and also may prevent the cargo from becoming wet from rain during travel or temporary storage in the bed/trailer. Such conventional tarps are typically rolled-up to reveal the open top of the bed/trailer for loading of cargo, and then unrolled to cover the open top.

Many conventional rolling tarps are adapted to roll in a direction that is transverse to the length of the truck bed or trailer, and are frequently called "side-rolling" tarps. Such side-rolling tarps are typically provided on truck beds or trailers that are substantially box-shaped, wherein all four vertical sides of the "box" are generally the same height. In such beds/trailers, the unrolled tarp is substantially horizontal, as it extends generally between two horizontal side edges of the bed/trailer that are at the same elevation. Therefore, the entire rolling process is substantially horizontal rather than vertical, and the total length of tarp that must be furled is approximately equal to the transverse width of the bed/trailer.

Side-rolling tarps powered from a single end are ineffective, and therefore typically not used, on beds/trailers that have a significantly lower side, such as trailers adapted to receive "blow-in" produce such as silage. In such conventional "low-sided" bed/trailers, one side is several feet lower than the opposite side and the front and rear ends, so that farm product may be generally horizontally "blown-in" to the bed/trailer over the low side. Said opposite side connects to a partial roof that extends at an upward angle over about half of the bed/trailer to form a roof peak. The blown-in product is stopped, and/or contained, by said opposite side, the partial roof, and the front and rear ends, during loading of the product. The same partially-open, partially-closed roof system, without a side-rolling tarp, helps to contain the product/cargo during transport to some extent, but is problematic and less than optimal at highway speeds.

Such low-sided beds/trailers typically have elongated span members ("bows") that are transverse to the length of the bed/trailer and spaced apart at multiple locations along the length of the bed/trailer. The bows are spaced apart far enough to allow the product to be blown in or otherwise easily loaded into the bed/trailer. The bows typically extend from at or near the roof peak of the partial roof generally horizontally to a position above the low side, then bend about midway along their length to form bow corners generally above said low side, and then extend down to connect to said low side. The bows may be used to support a tarp or other covering over the open top of the bed/trailer and/or may contribute structural strength to the bed/trailer.

If a conventional side-rolling tarp, powered from a single end of the bed/trailer, were provided on a low-sided bed/trailer, the proximal end of the tarp would be secured to the bed/trailer at or near the roof peak. The tarp would unroll generally horizontally (slightly downward) along the upper portion of the bows and then would extend generally vertically down the vertical portions of the bows toward the low side, against which the tarp distal edge would be secured. A Shurlock™ latch system, ties, latches, or other systems could be used to secure the distal edge to the low side. The rolling-up process would begin, therefore, at or near the low side edge, and the tarp would have to roll generally vertically upwards to the corners of the bows, and then would continue to roll "up-hill" to near the peak of the roof. Substantially the entire process would therefore be "up-hill." This process, powered from one end of the bed/trailer, has been attempted and has been shown to be unacceptably difficult and inaccurate. The roll becomes very non-uniform along its length, with the end near the power source being tight, and the opposite end being loose and sloppy. This non-uniformity typically exhibits itself by the time the roll reaches the bow corners, and becomes so extreme that such side-rolling tarps are conventionally understood to be ineffective on such low-sided beds/trailers.

Therefore, there is still a need for an improved rolling tarp system. The invention meets this need, and, in preferred embodiments, provides a simple and economical system for solving or limiting the previous problems exhibited by rolling tarps. Preferred embodiments provide a system for consistent and tight rolling of a tarp even on a low-sided farm produce trailer or truck bed, as discussed above, which previously has been a particular problem in the industry. Instead of using a rigid metal partial roof to partially cover a low-sided trailer and/or using an ineffectively/inaccurately-furled tarp or other cover, a side-rolling tarp according to embodiments of the invention may be retracted, for loading of cargo/produce, to about the peak of the tarp roof in a consistent and controlled rolling method previously not achievable in tarps powered from a single end of the tarp. Thus, the preferred embodiments of the tarp bar allow a low-sided trailer to be fitted with a side-rolling tarp, rather than a rigid metal partial roof, for covering the trailer during transit, but wherein the tarp may be retracted to about the peak of the tarp roof in a consistent and controlled rolling method.

SUMMARY OF INVENTION

The invention comprises a tarp bar that may be installed in or on a tarp, wherein the tarp bar is spaced from the distal edge of the tarp and spaced from the drive bar that is used to power the rolling process. The tarp bar is generally parallel to the drive bar, and both tarp bar and drive bar are typically parallel to the length of the bed/trailer the tarp is intended to cover. The drive bar may be said to be at or near the distal edge, as it will be firmly secured/connected to the fabric of the tarp in such as way that the drive bar can roll the tarp. Preferably, the tarp bar is located at what may be called an intermediate region of the tarp, so that the tarp bar is located in a range of about ⅕ to ¾ and more preferably, ⅕-½, of the distance from the distal edge of the tarp to the proximal edge of the tarp, and, when used to cover a low-sided bed/trailer, is preferably located at or near the bow corners. In other words, the tarp bar is preferably located not at the distal edge and not at the proximal edge, as the tarp bar benefits the rolling process by being intermediate between these locations, wherein "intermediate" is a broad range of locations depending on the specifics of the tarp and the trailer/bed.

When the preferred tarp is rolled-up, as further described later in this document and portrayed in the figures, one may say that a distal portion of the tarp is first rolled-up to form a pre-roll to the point at which the pre-roll reaches the tarp bar. The pre-roll then becomes cradled or otherwise received in the tarp bar, and further rolling of the tarp comprises a middle region of the tarp (for example, tarp portion 52 in the figures) being rolled/wrapped around the combination of the pre-roll and the tarp bar. The tarp may be rolled all the way to the proximal edge of the tarp or only part way to the proximal edge.

The tarp bar is shaped to include a longitudinal space, indent, or other recess preferably at or near the longitudinal centerline of the tarp bar, which may receive another elongated object that is presented to the tarp bar in an orientation that is generally parallel to the tarp bar. During the rolling process, the drive bar first rolls-up the distal portion of the tarp to form what is called herein the "pre-roll" and, upon reaching the tarp bar, the pre-roll is received in said longitudinal recess. Even if the pre-roll is non-parallel to the tarp bar when it reaches the tarp bar, the tarp bar recess tends to cradle the pre-roll and align it in said longitudinal recess so that the pre-roll becomes exactly, or nearly exactly, parallel to the tarp bar once the pre-roll is cradled in the tarp bar. Hence, a first object of the preferred tarp bar is that it tends to correct non-uniform rolling that has already occurred by the time the pre-roll reaches the tarp bar.

After the pre-roll becomes cradled in the tarp bar, continued rolling of the tarp rotates the pre-roll-plus-tarp-bar combination toward the proximal edge of the tarp, so that the proximal tarp portion becomes rolled around said combination to form a roll of increasing diameter. A second object of the preferred tarp bar is that it strengthens the roll, which prevents/limits torsion/twisting of the drive bar that could otherwise result in an uneven and inconsistent rolling process.

A third object of the preferred tarp bar is that the tarp bar is adapted in shape so that the roll, during at least a portion of the rolling process, is non-circular in cross-section. The tarp bar preferably is greater in width that the diameter of the pre-roll, so that its longitudinal edges protrude out beyond the outer surface of the pre-roll. This creates a substantially non-cylindrical shape for the pre-roll plus tarp bar combination, which tends to create an incremental rather than continuous rolling motion after the pre-roll has become cradled in the tarp bar. This incremental rolling motion tends to improve the accuracy and consistency of the rolling process. The entire length of the non-cylindrical roll tends to pivot/flip over each of its corners at the same or substantially the same time, with each flip representing equal incremental advancement of the roll that tends to more snugly wrap the tarp material around the advancing roll.

These and other objects of the preferred embodiments will be further understood by reference to the Drawings and the following Detailed Description. However, the Drawings and Detailed Description should be understood to illustrate some, but not the only, embodiments of the invented tarp bar and methods of using the same.

BRIEF DESCRIPTION OF THE DRAWINGS

In FIG. 1, the general location of the tarp bar is shown by a dashed line. FIGS. 11A-C, discussed later in this document, show the preferred location of the tarp bar in more detail.

FIG. 9 is a front view of the tarp system and trailer of FIGS. 5-8.

FIG. 10 is a rear view of the tarp system and trailer of FIGS. 5-9.

FIG. 11A is a right side perspective view of the tarp system and trailer, illustrating the preferred location of the tarp bar in dashed lines.

FIG. 11B is a partial, right side perspective view of the tarp system and trailer of FIG. 11A, wherein a portion of the tarp fabric is cut away to show the preferred tarp bar.

FIG. 11C is a schematic end view showing the preferred tarp bar received in a pocket in the tarp, wherein the tarp bar and the pocket are resting on bow corners (one bow corner shown in the figure) with the tarp bar at generally a 45 degree angle between horizontal and vertical.

FIG. 12 is a bottom view of a preferred embodiment of the tarp bar.

FIG. 13 is an end view of the tarp bar of FIGS. 11C and 12.

FIGS. 20-22 are side perspective views of some of the many alternative embodiments of tarp bar within the scope of the invention.

FIGS. 23, 24, and 25 are end view of FIGS. 20, 21, and 22, respectively.

DETAILED DESCRIPTION OF THE PREFERRED EMBODIMENTS

Figure 1:
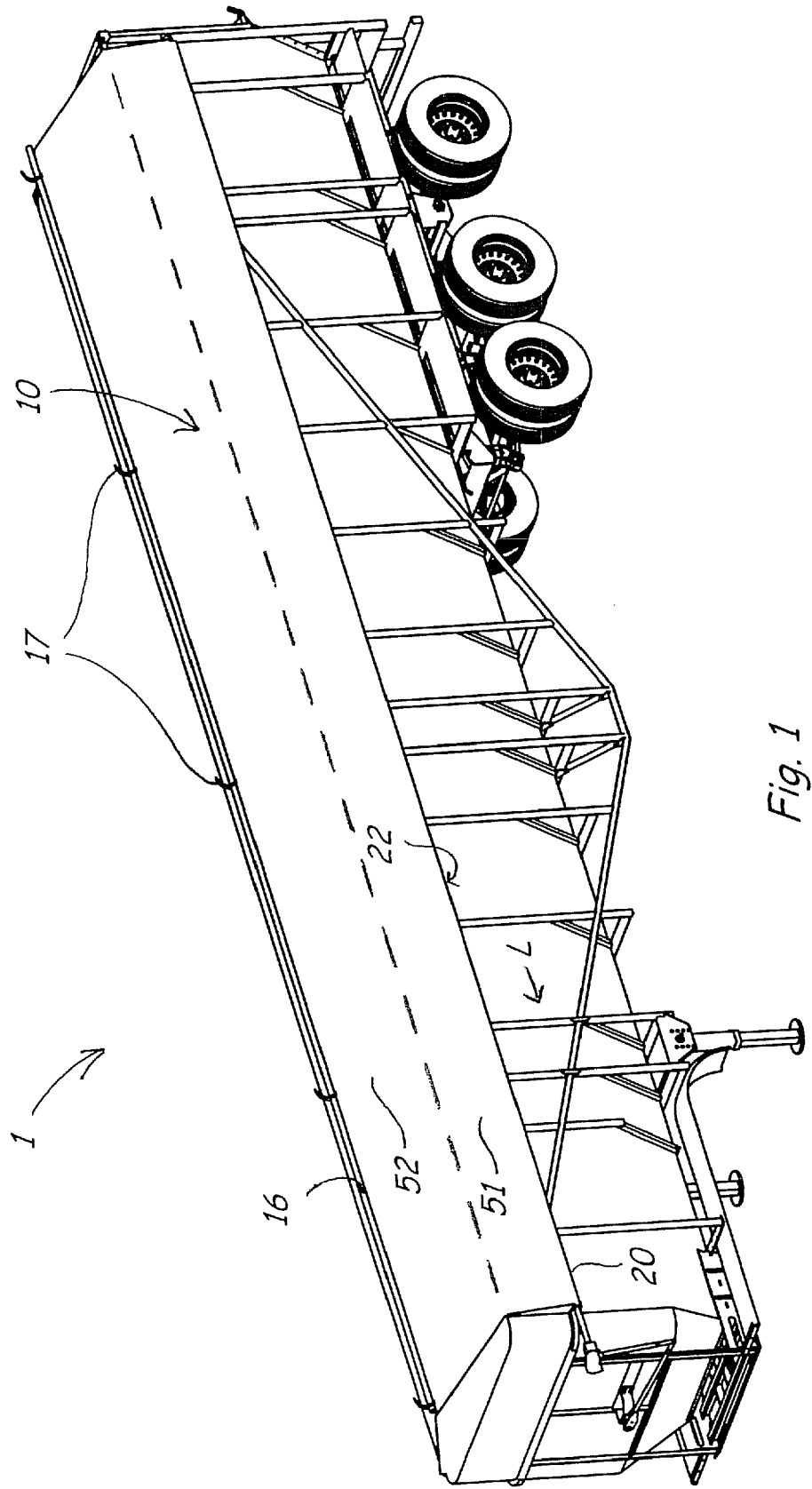
FIG. 1 is a front, left side perspective view of one, but not the only, embodiment of the invented tarp system installed on one embodiment of a low-sided trailer, wherein the tarp system is in the fully closed, unfurled position. It will be understood from this document that an embodiment of the invented tarp bar is installed in the tarp system of this FIG. 1 and of FIGS. 2-10, but is not visible because the tarp bar is preferably received inside a pocket of the tarp and/or attached to the tarp on the underside of the tarp.

Referring to the figures, there are shown several, but not the only, embodiments of the invented tarp bar, a rolling tarp system that incorporates the tarp bar, and methods of using the tarp bar and tarp system. The preferred tarp bar is specially adapted in shape so that it may serve as an alignment member, a reinforcement member, and a furling control member, without adding substantial weight or complexity to the tarp system, as will be further described below.

The preferred tarp bar is provided separately, and a significant distance, from the drive bar or other elongated member that is powered to cause the rolling-up (also, furling) and unrolling (also, unfurling) of the tarp. The tarp bar is preferably not powered, and is preferably attached only to the tarp material to be parallel to the length of the tarp and the bed/trailer, about ⅕-½ of the way from the distal end to the proximal end of the tarp. The tarp bar is preferably not attached or directly connected to the drive bar and/or any other mechanized system, except that it resides in/on the tarp that is furled/unfurled by the preferred drive bar.

The tarp bar preferably is recessed or otherwise concavely shaped along its longitudinal centerline, to allow cradling of an already-rolled portion of the tarp, and, hence, to orient the already-rolled portion to be parallel to the tarp bar. Further, the tarp bar is preferably broader than said already-rolled portion, so that two opposing edges of the tarp bar extend out beyond the diameter of the already-rolled portion. This way, the combination of the already-rolled portion received in the preferred tarp bar comprises a non-cylindrical unit, and subsequent rolling-up of the tarp tends to occur in incremental, partial-rotation steps. This incremental, cam-like rolling mechanism, powered by the drive bar, tends to maintain more consistent tension on the tarp, on both ends of the tarp and all along the tarp length, and forms a tighter, more consistent and even roll along the entire length of the roll.

Referring specifically to the figures, there is shown in FIGS. 1-10, one embodiment of a trailer 1 that is fitted with a side-rolling tarp system 10 according to one embodiment of the invention. The trailer 1 is a "low-sided" trailer sold by Trinity Trailer, of Boise, Id., and is similar to those described in the Related Art section except that this trailer uses a side-rolling tarp system 1 rather than a rigid partial roof and rather than any other tarp/cover (typically ineffective on such trailers, as discussed in the Related Art section). The tarp system 10 comprises tarp material that covers the top and low side opening 11 of the trailer 1, and a power arm 12 that connects to the drive bar 14. Drive bar 14 extends the whole length of the tarp, and, given that some trailers are over 40 feet in length, can twist and cause uneven and/or loose and sloppy rolling of the tarp when it is being retracted. As discussed above in the Related Art section, the preferred embodiments improve the consistency and evenness of the rolling process.

The tarp system 10 is supported/suspended along approximately its longitudinal centerline by a longitudinal ridge pole 16. Ridge pole clamps 17 extend from the ridge pole 16 to catch the tarp roll when it is fully furled, as in FIGS. 5-10. Multiple, transversely-extending bows 18 extend between the right and left sides of the trailer "box" and have corners 19 generally above the low-side L (here, the left side) of the trailer.

Figure 11A:
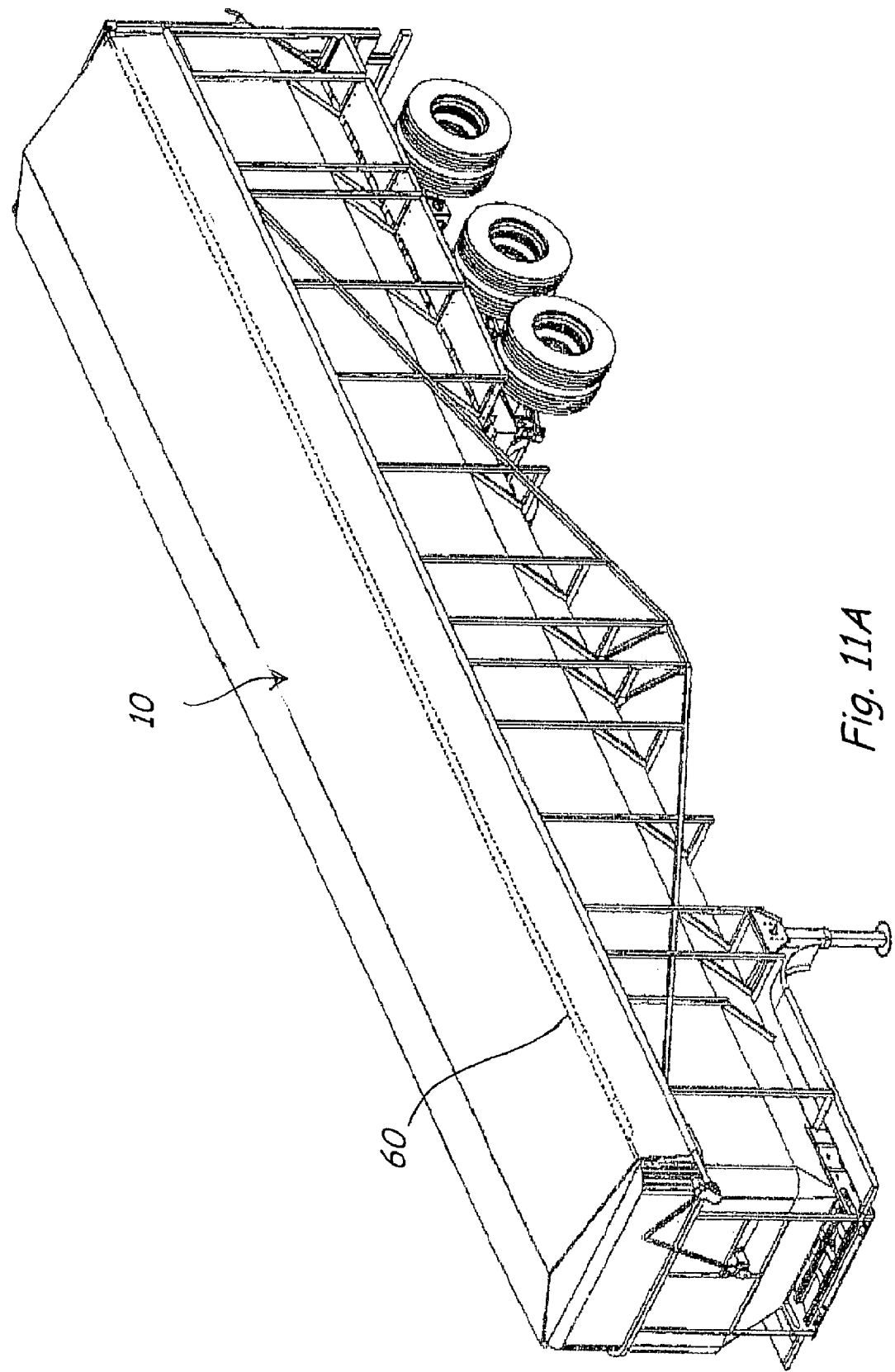

The tarp bar is preferably installed on/in the tarp at a location that results in the tarp bar being located at the corners 19 when the tarp is fully unrolled, as illustrated in FIG. 11C. The preferred bow corners 19 are bent/curved, rather than being sharp corners, to help prevent tearing of the tarp, but the tarp bar being "corner location" further prevents tearing of the tarp by reinforcing the tarp that that location and preventing the tarp from being pulled so tight against the corners 19 that the corners gouge and tear through the tarp fabric.

The tarp bar is also preferably placed at this "corner location", because it has been found by the inventors to be an optimum position for excellent tarp system operation. For example, placing the tarp bar at the bow corners prevents the pre-roll from becoming cradled in the tarp bar too soon, that is, when the drive bar is rolling up tarp portion 51 by rolling nearly vertically upward. If the pre-roll were to become cradled in the tarp bar on this nearly-vertical portion of the rolling path, it would difficult or impossible for the preferred drive system to continue rolling-up of the combination (of pre-roll plus tarp bar), and the rolling process would stop, stall, and/or become otherwise ineffective. Further, if the tarp bar were placed "uphill" of the bow corners 19, that is, in/on tarp portion 52 (closer to the ridge pole 16 than the corners), the area of the tarp resting against the corners 19 would not be reinforced by the tarp bar or typically not by any other structure, and the tarp might tend to tear and/or otherwise wear or become damaged. Such an "above the corners" tarp bar location would also result in cradling of the pre-roll in the tarp bar later in the rolling process, which could result in the pre-roll being even more uneven from end to end and could therefore result in a less-optimal rolling process and result.

Figure 2:
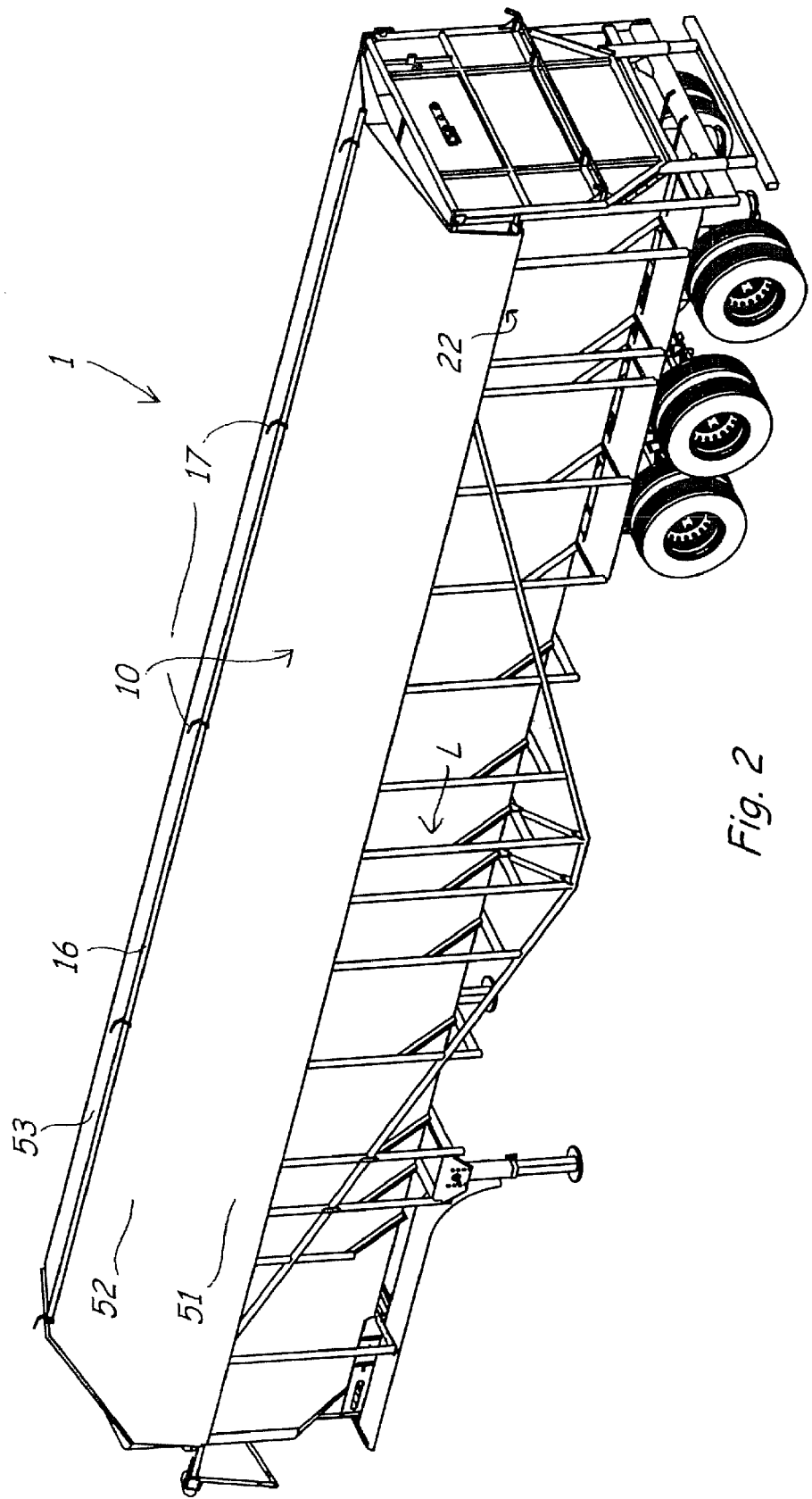
FIG. 2 is a rear, left side perspective view of the tarp system and trailer of FIG. 1.
Figure 3:
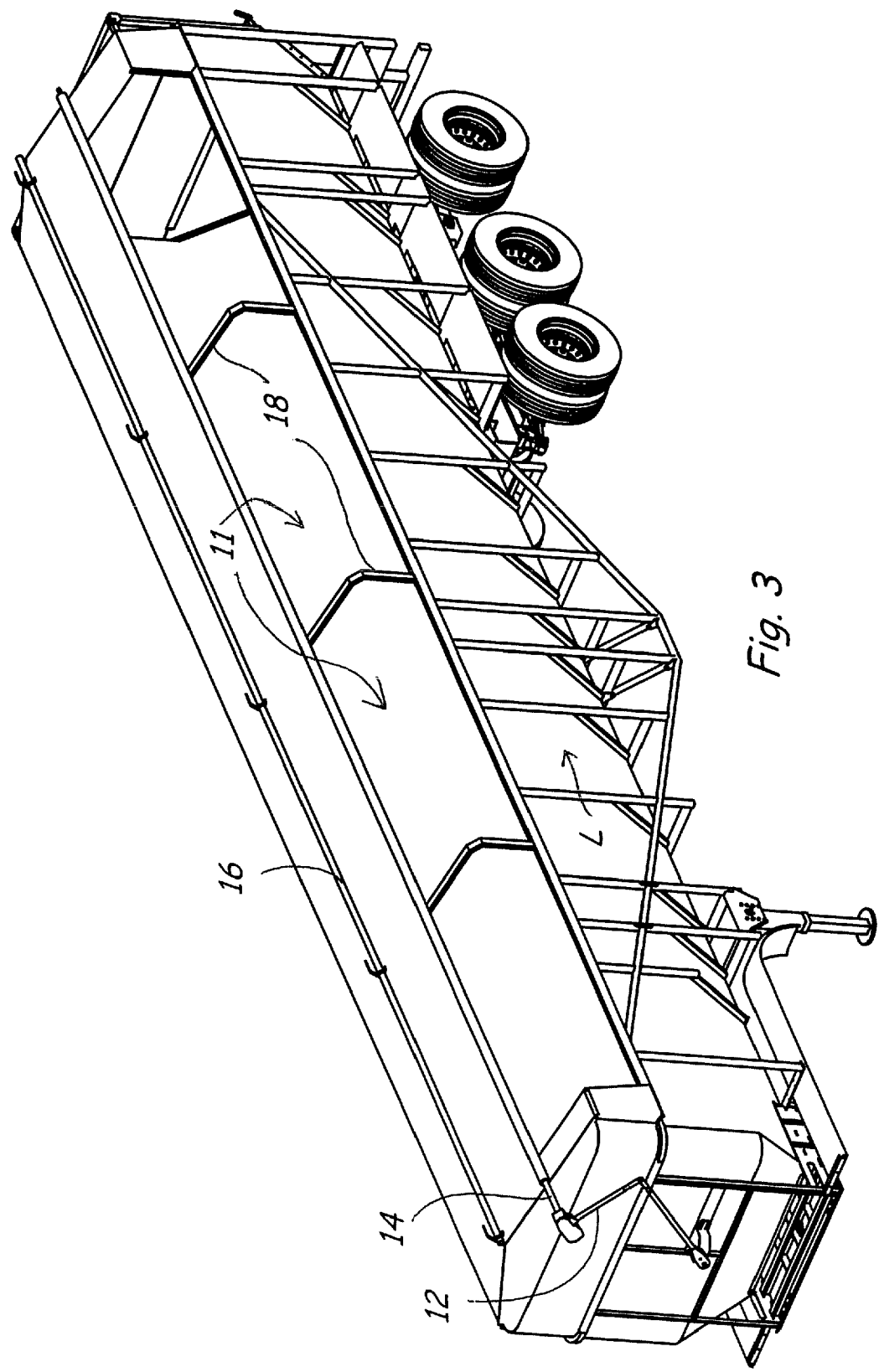
FIG. 3 is a front, left side perspective view of the tarp system and trailer of FIGS. 1 and 2, with the tarp system in a partially rolled-up (partially open) position.
Figure 4:
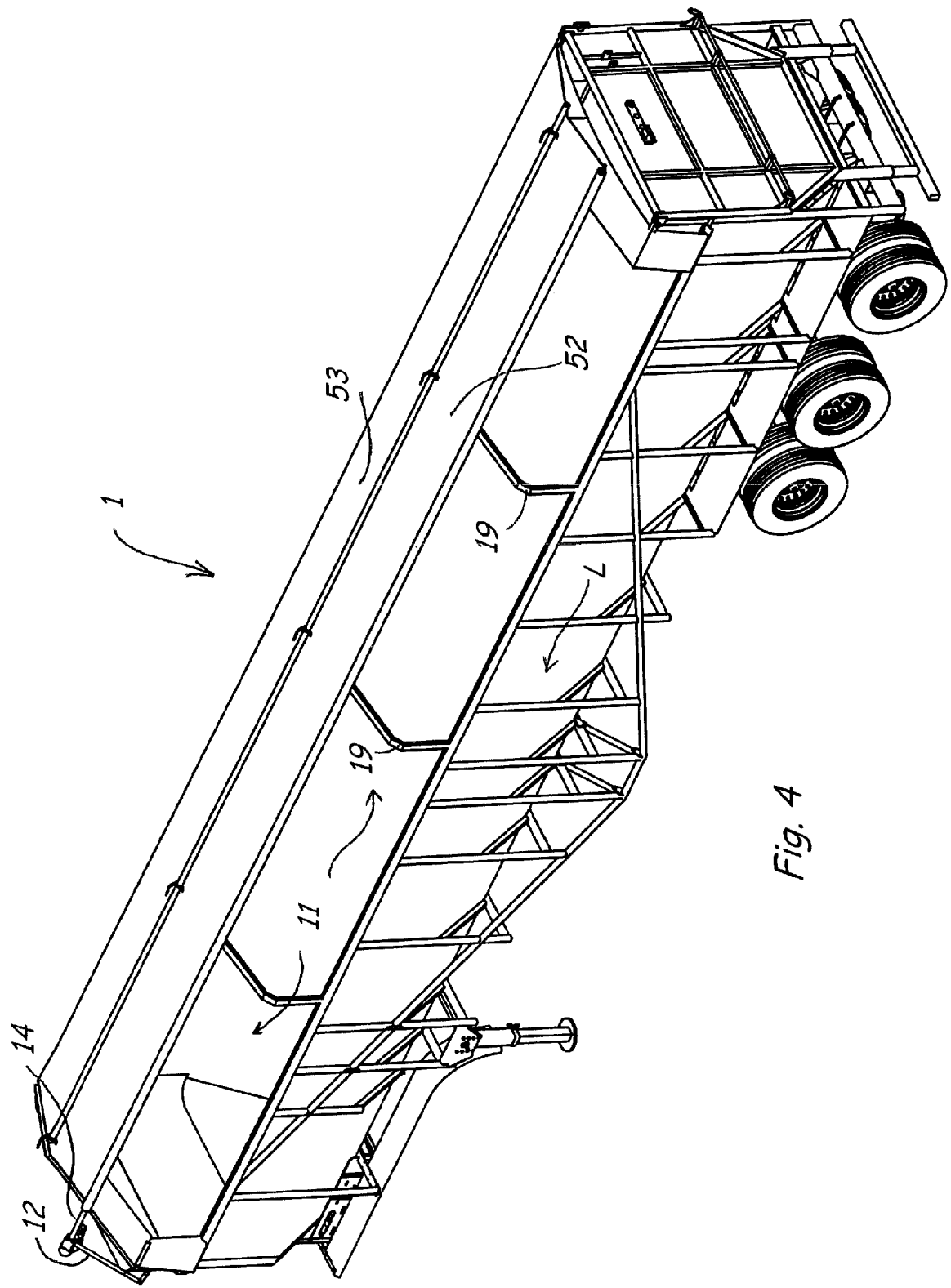
FIG. 4 is a rear, left side perspective view of the tarp system and trailer of FIG. 3.
Figure 5:
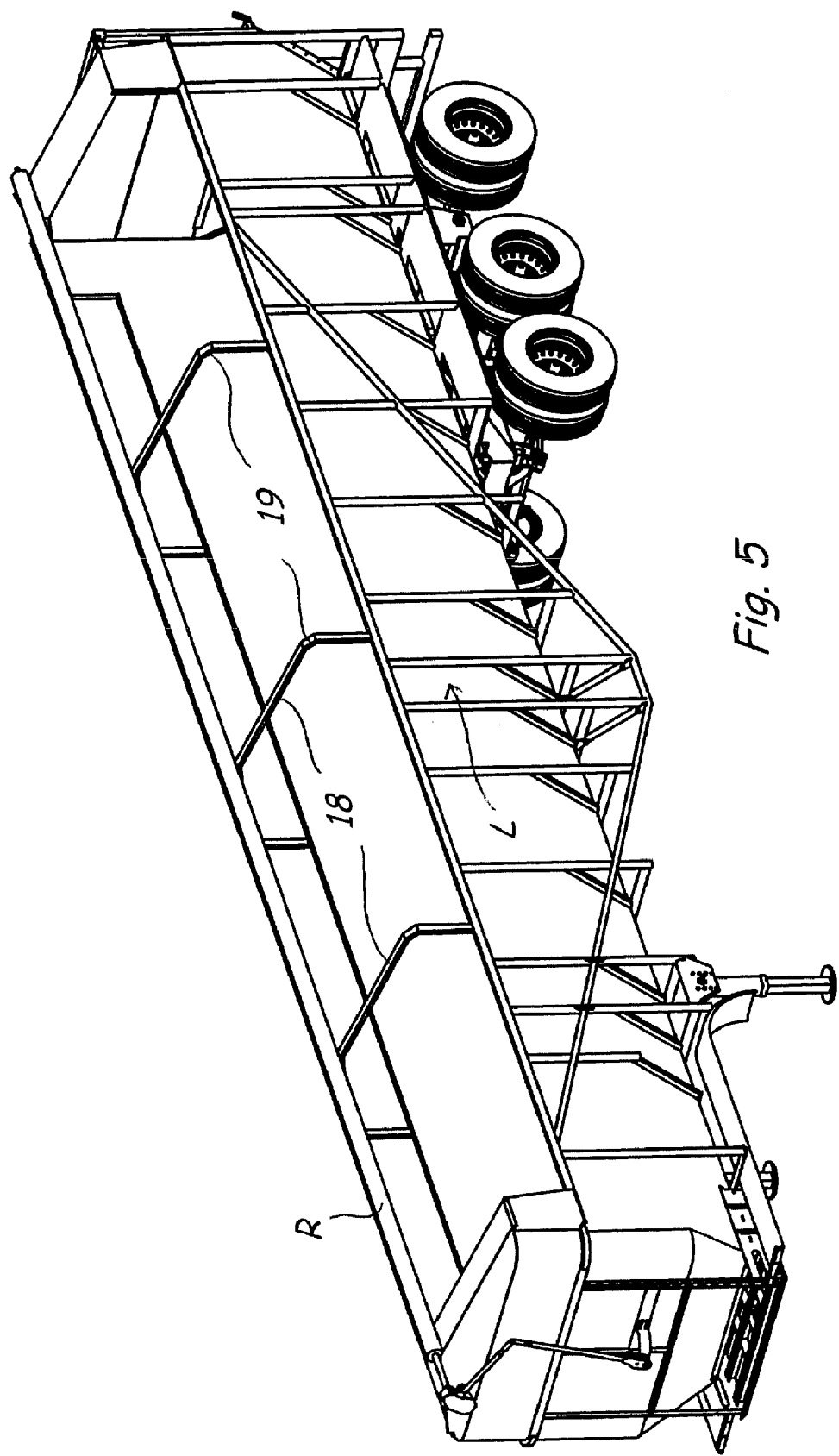
FIG. 5 is a front, left side perspective view of the tarp system and trailer of FIGS. 1-4, with the tarp in the fully rolled-up (fully open) position, wherein "fully rolled-up" in this embodiment is defined as the tarp being rolled-up to the point where it reaches the ridge pole of the roof and is captured by clamps associated with the ridge pole. The top, right side of the trailer is also covered by a portion of the tarp, but this right tarp portion is not required, and preferably does not, roll up during normal use of the trailer. In other trailer/bed embodiments and other tarp system embodiments, the tarp would roll-up to a greater extent and/or to a lessen extent depending on the needs for covering and uncovering the trailer/bed.
Figure 6:
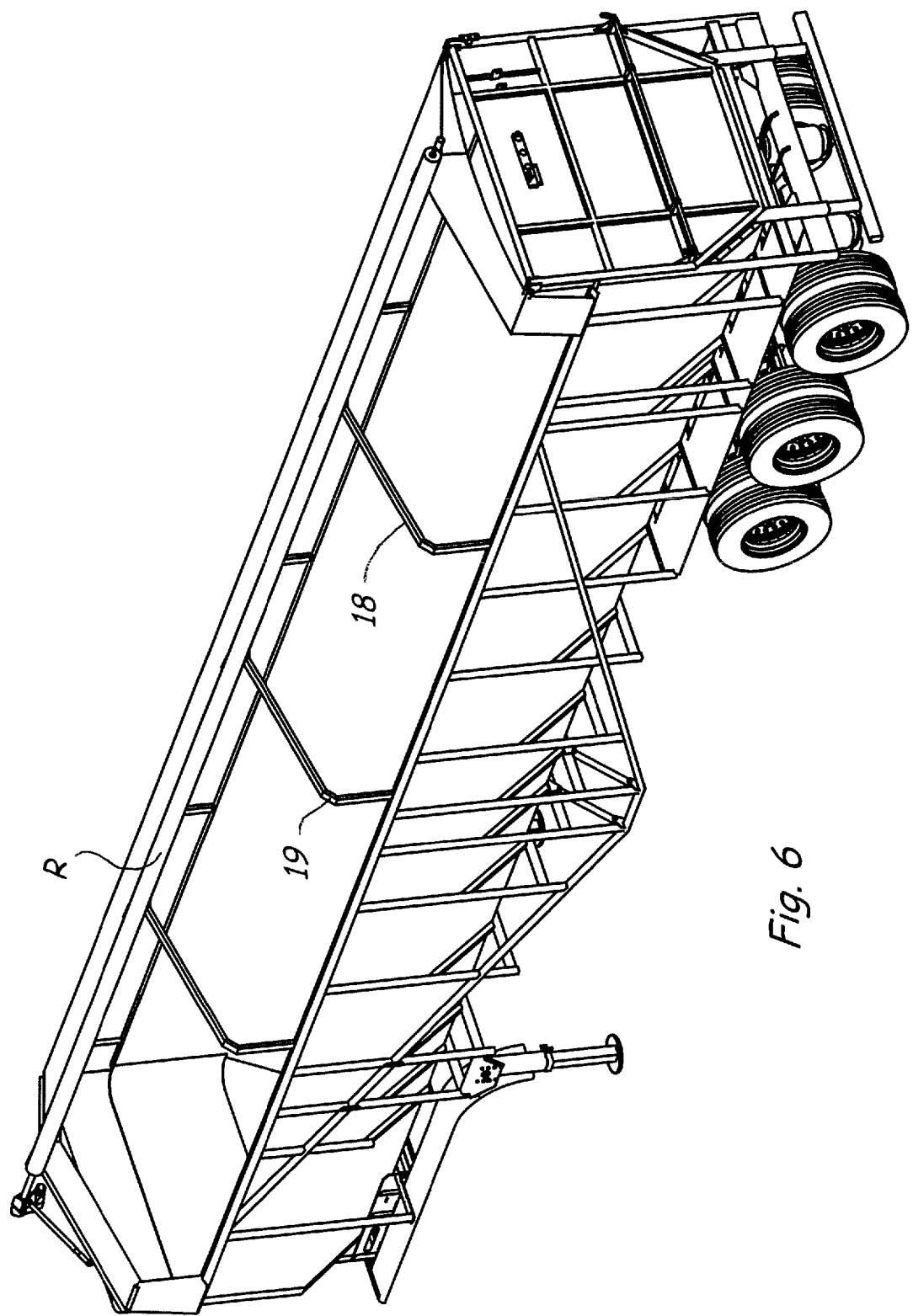
FIG. 6 is a rear, left side perspective view of the tarp system and trailer of FIG. 5.
Figure 7:
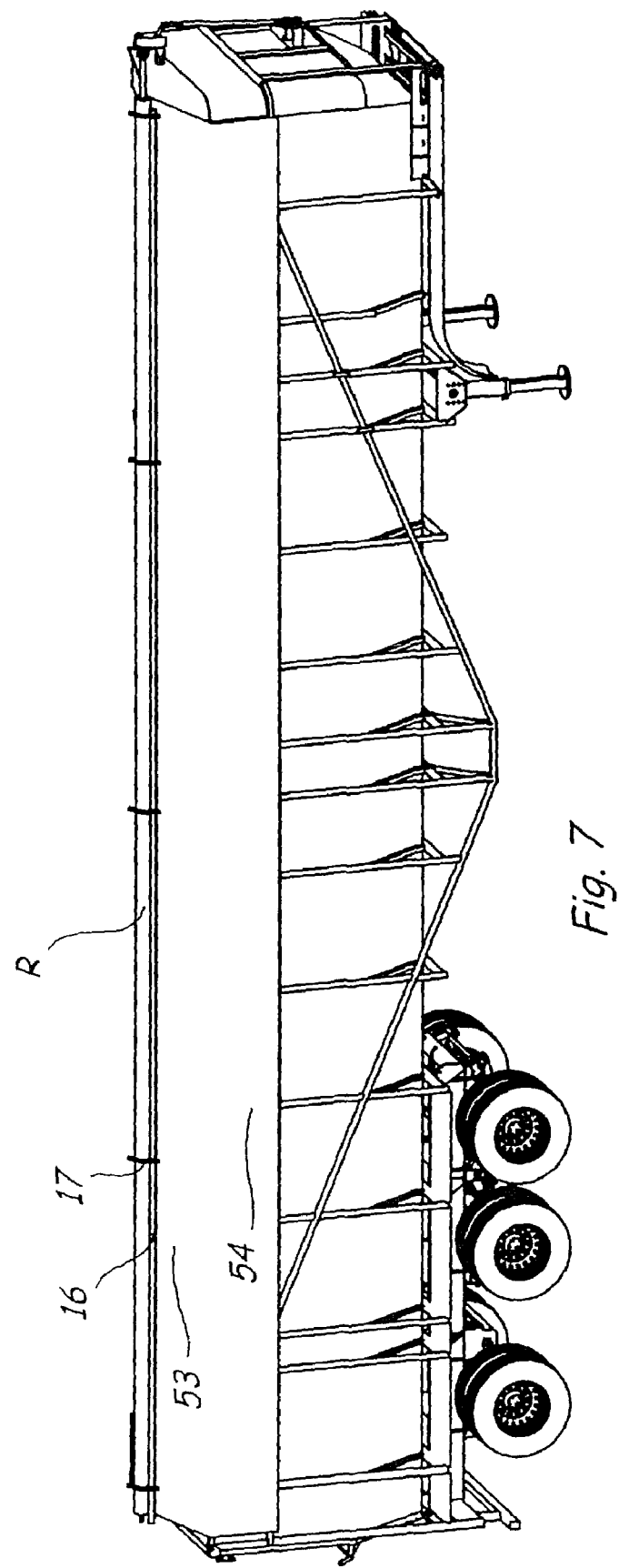
FIG. 7 is a right side perspective view of the tarp system and trailer of FIGS. 5 and 6 (note that the tarp is still fully open, and the right portion of the tarp remains covering the top, right side of the trailer).
Figure 8:
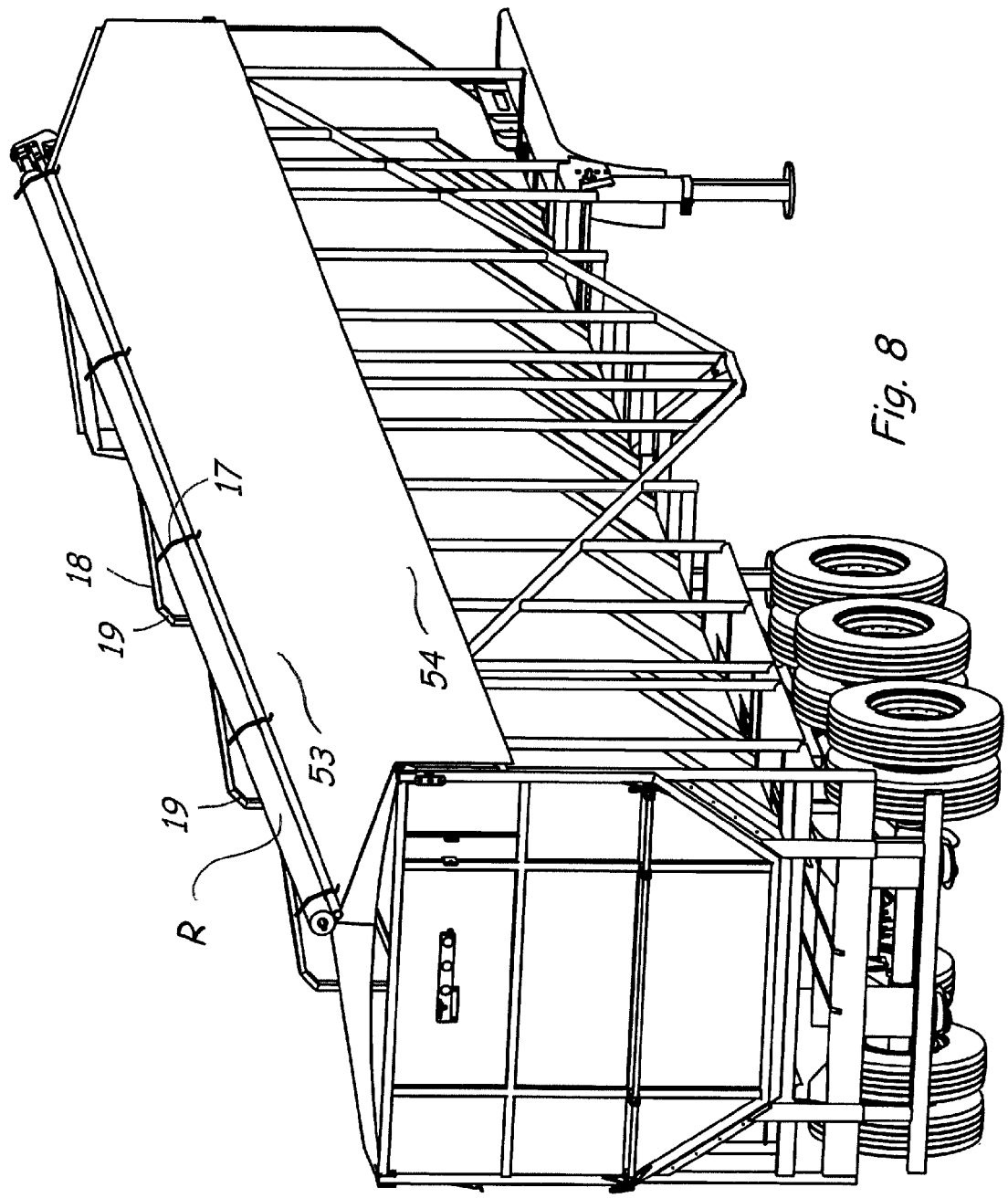
FIG. 8 is a rear perspective view of the tarp system and trailer of FIGS. 5-7.

The tarp system 10 is shown in the un-rolled (closed, unfurled) position in FIGS. 1 and 2 that covers the trailer, in the partially rolled position in FIGS. 3 and 4, and in the fully rolled-up (open, furled) position in FIGS. 5-10 wherein a side of the top of the trailer is uncovered. When unfurled, the distal edge 20, to which the drive bar 14 is attached, may be secured to the left side of the trailer 1 by means of a Shurlock™ latch system 22 (which is well understood by those of skill in the tarp arts), or by other means such as hooks, ties, or other fasteners. The Shurlock™ latch system 22 provides a lip or protruding plate system on the side of the trailer, around which lip/plate the drive bar moves at the end of the unfurling process, so that the last degrees of rotation in the direction of unfurling tends to tighten the drive bar behind the lip/plate, latching the drive bar in that position and, hence, latching the tarp in the unfurled position. When fully furled, the tarp roll R is at the peak of the tarp-formed roof, and is received by ridge pole clamps 17.

One may note that a major difference between the preferred trailer 1 and conventional low-sided trailers is that trailer 1 comprises a tarp roof that covers the entire top of the trailer, rather comprising a rigid partial roof as described in the Related Art section. When the tarp is fully closed/unfurled, as in FIGS. 1 and 2, one may see roof portion 51 that is near the distal edge 20 of the tarp and that extends down along the vertical side of the bows above the low side L of the trailer. One may also see roof portion 52 that resides generally between the corners 19 of the bows 18 and the ridge pole 16. When the tarp is closed, partially open, or fully open, one may see roof portion 53, which is between the ridge pole 16 and the right side bow corners, and roof portion 54, which extends down along the right side of the bows 18 to the right side of the trailer. Typically, roof portions 53 and 54 do not move and remain in their positions covering the right side of the trailer up to the ridge pole 16; therefore, it may be noted that "fully opened" in describing the tarp roof of the preferred embodiment means opening/furling the tarp to an extent that rolls up roof portions 51 and 52, but leaves the right side of the trailer covered by roof portions 53 and 54. Of course, a mirror image trailer, or a trailer where both sides roll up, may be made, for example, as will be understood by one of skill in the art after reading this Description and viewing the Drawings.

As shown to best advantage in FIGS. 11A, 11B, 11C, and 12-13, tarp bar 60 is connected to the tarp material at a location that places the tarp bar, when the tarp is fully unfurled, near or most preferably at the bow corners 19, as discussed above in this document. The tarp bar 60 may be sewn into the tarp, installed in a pocket P in the tarp material, fastened to the outer surface or the underside of the tarp material, or otherwise attached so that is parallel or substantially parallel to the length of the trailer and to the drive bar 14. In other words, the tarp bar 60 may be secured to the tarp fabric in various ways that will result in the tarp being fixed in place relative to the tarp fabric to an extent that the tarp bar 60 does not slide out of the tarp fabric and does not slide or twist significantly relative to the tarp fabric. Some movement of tarp fabric relative to the tarp bar is acceptable and may be desirable, for example, to allow flexing of the tarp fabric PF of a pocket P (FIG. 11C) into the cradle space 66 to allow proper cradling of the pre-roll in said cradle space as described and shown elsewhere in this document. Therefore, in FIG. 11C, the tarp bar 60 may be fixed by fasteners, ties, or straps S, to a portion of the pocket fabric, while portion PF is loose and/or sized large enough to flex/protrude into the cradle space 66. Alternatively, for example as shown in FIGS. 14-19, the tarp bar 60 may be connected/secured to the tarp fabric in other ways. In FIGS. 14-19, there is no pocket shown and it may be understood that the tarp bar may be secured to the upper/outer surface of the tarp and/or in other ways that will allow the desirable processes of rolling and cradling.

The preferred tarp bar 60 is generally the same length as the tarp and comprises two long tubular members 62 connected at multiple, spaced locations along the length of the tubular members by short connecter members 64. Providing multiple connector members 64 rather than a continuous connector along the length of the tubular members 62 helps reduce the weight of the tarp bar 60 while maintaining the desired shape and strength of the tarp bar. All of the tubular members 62 and the connector members 64 are preferably rigid and immovable relative to each other. The connector members 64 may be said to be fixed to, and therefore to connect to, a bottom surface of each of the tubular members 62, thus being located toward a bottom side of the tarp bar 60 and thus creating a larger cradle space 66.

Figure 14:
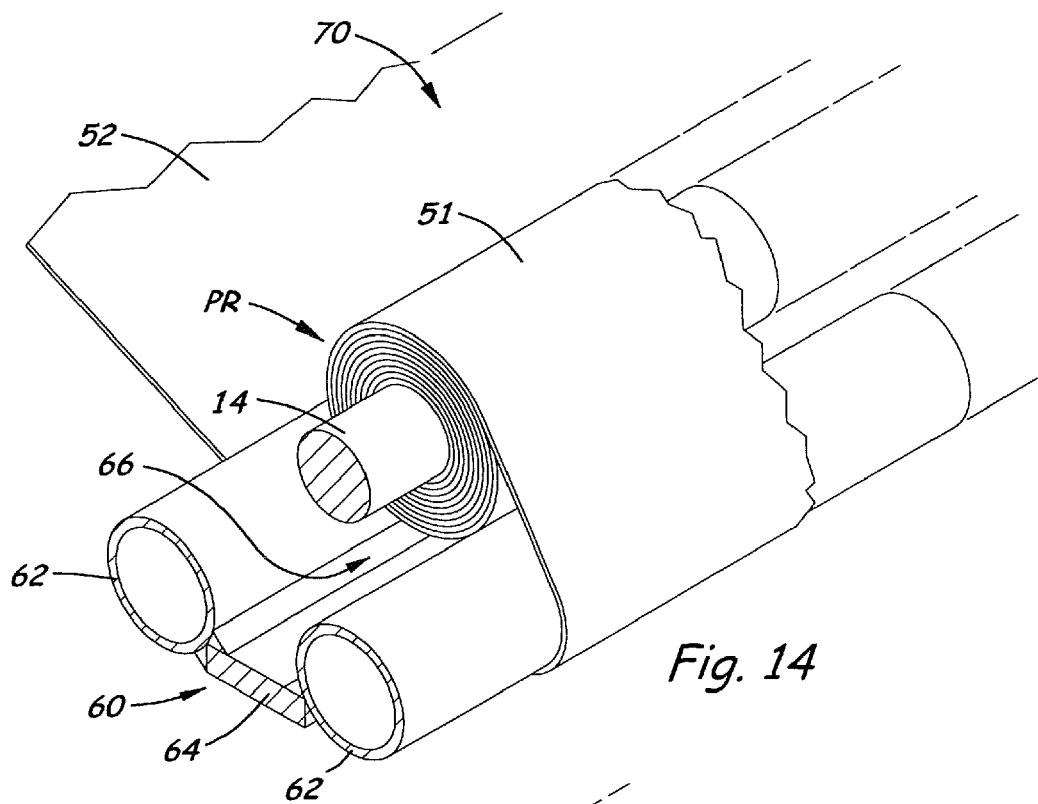
FIG. 14 is an end perspective view of a combined roll unit that is formed from a previously-rolled portion of the tarp being cradled in the tarp bar of FIGS. 11C, 12 and 13.

As best illustrated in the end view of tarp bar 60, the connector members 64 are provided generally on the bottom side of the tarp bar rather than along the center plane of the tarp bar 60, so that a cradle space 66 is created between the tubular members 62. As shown in FIG. 14, it is this cradle space 66 that receives the pre-roll PR when the roll-up tarp reaches the tarp bar 60. Pre-roll PR may be described as the drive bar plus the tarp material rolled around that the drive bar 14 rolls up prior to reaching the tarp bar 60. Generally, one may say that the pre-roll PR is the drive bar plus tarp roof portion 51, but, in less-preferred embodiments wherein the tarp bar 60 is positioned slightly above the bow corners 19, the pre-roll PR may also comprise a small amount of roof portion 52, that is, the tarp material between the corners 19 and the tarp bar. The pre-roll PR represents the first few feet of tarp rolling, but still the pre-roll may be slightly unevenly-rolled and/or slightly non-parallel to the tarp bar 60. When the pre-roll PR falls down/nestles down into the cradle space 66, the entire length of the pre-roll PR will tend to straighten in the cradle space to bring the pre-roll PR back into being perfectly, or nearly perfectly, parallel to the tarp bar and the length of the trailer 1. The pre-roll PR tends to slide/fall down along the "cradle sides" formed by the inner surfaces 68, so that the pre-roll aligns itself with the length of the tarp bar 60. Thus, the tarp bar preferably serves as an alignment member to return the pre-roll PR to, and/or retain it in, a parallel orientation relative to the length of the tarp and the length of the trailer (both lengths being into the paper in FIG. 9).

Figure 15:
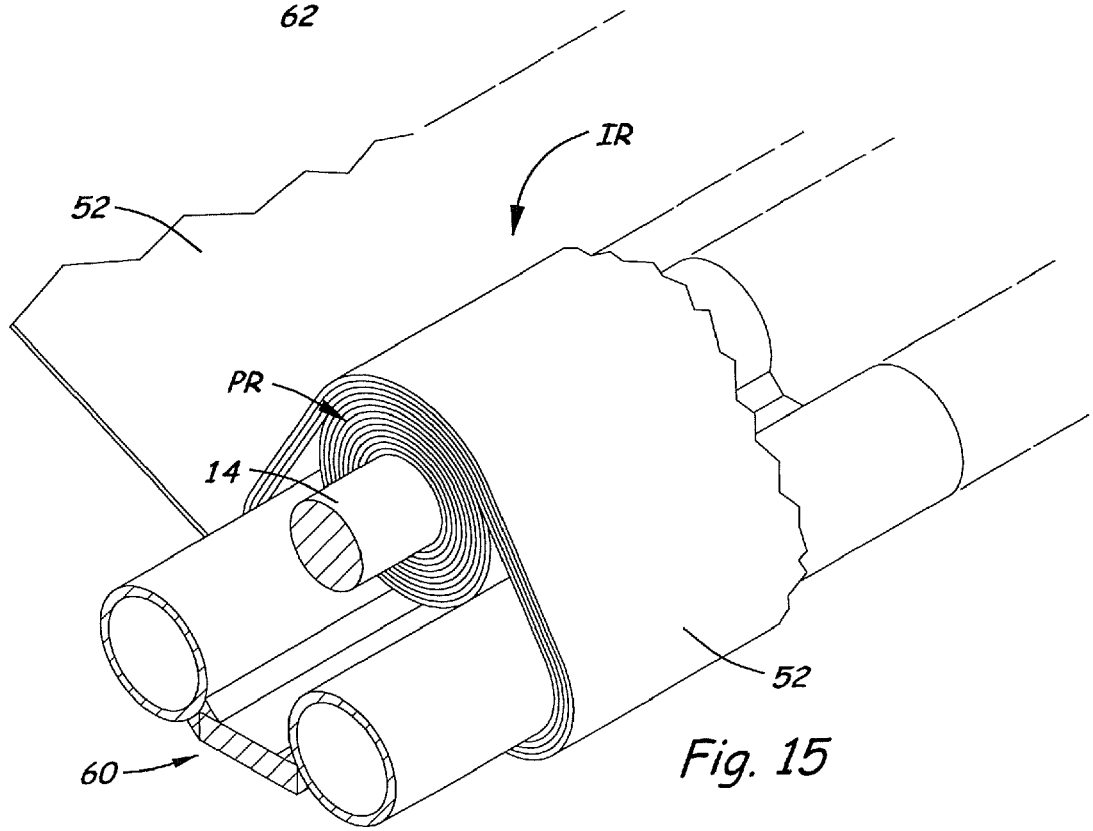
FIG. 15 is an end perspective view of the combined roll unit after further furling of the tarp system, wherein the combined roll unit is now wrapped in additional layers of the tarp material, forming what is called herein an "intermediate roll" that occurs during rolling generally between the tarp bar location and the final, fully-furled position.
Figure 16:
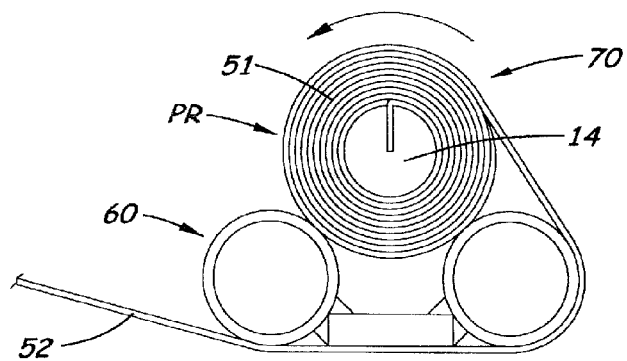
FIGS. 16-19 illustrates the rolling process of particular interest in the preferred embodiments of this invention, starting with the combined roll unit in FIG. 16, and continuing with subsequent rolling steps as the intermediate roll "flips" over its three corners, the tarp material being tensioned equally, or substantially equally, all along the length of the roll during the process by the force applied via the drive bar.
Figure 17:
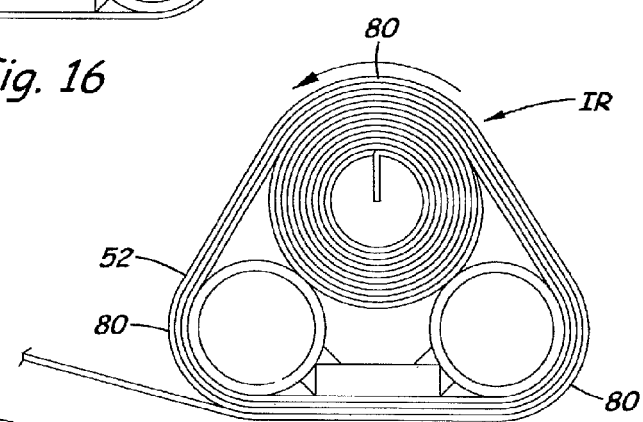
Figure 18:
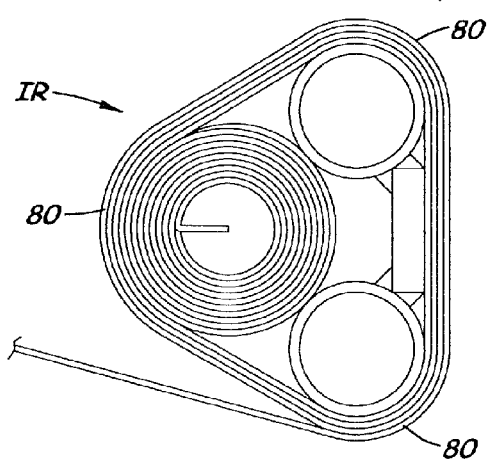
Figure 19:
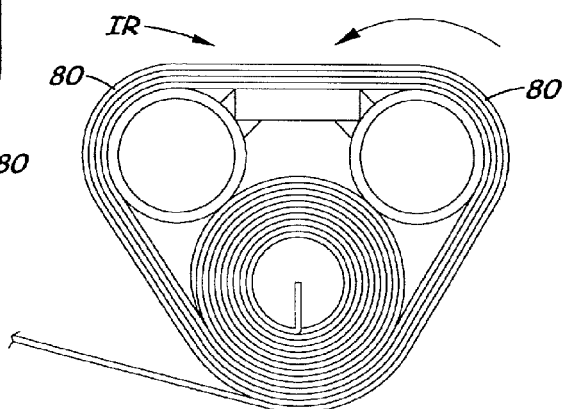

Once the pre-roll PR is received in the cradle space 66 to form combined roll unit 70, shown in FIG. 14, further rotational power supplied to the drive bar 14 will rotate the combined roll unit 70. The tarp bar serves as a reinforcement member, making the combined roll unit 70 stronger and less likely that one end of the roll will twist relative to the other end during subsequent furling. Within a few rotations, the tarp roll appears as shown in FIG. 15, and comprises combined roll unit 70 surrounded by additional wraps of tarp material (tarp roof portion 52) to form intermediate roll IR. This intermediate roll IR continues to be rolled up-hill toward the ridge pole 16 and clamps 17 to fully open the tarp. The up-hill rolling of the combined unit 70, and then intermediate roll IR (as soon as the combined unit becomes wrapped with additional layers of tarp material (52)), exhibits enhanced performance and consistency due to the shape and strength of the combined unit 70/intermediate roll IR, as will be further described below.

Rotation of the pre-roll PR plus tarp bar combined unit 70 provides unique and beneficial operation, which tends to keep the tarp roll even and tight. As illustrated by the end views in FIGS. 16-19, the combined unit 70 has a non-circular cross-section and end view, which in the preferred embodiment, is a generally triangular shape. The tarp bar 60 is wider than the pre-roll PR, so that tubular members 60 protrude out beyond the diameter of the pre-roll. This way, the outermost surfaces of the tubular members 62 and the outermost surface of the pre-roll PR, generally form three corners of a triangle. It is this non-circular cross-section (technically the non-cylindrical outer surface of the combined unit 70), and particularly the preferred triangular cross-section/surface, that create a cam effect in the rolling process from the time the pre-roll PR nestles into the tarp bar 60. This non-circular, preferably triangular shape persists for several rotations of the intermediate roll IR (as may be seen in FIGS. 17-19), so that the cam effect is also provided by the intermediate roll for a substantial part of rolling-up of tarp roof portion 52. By the time the rolling process is completed and the roll R is received in the clamps 17, the roll R may appear to be, and indeed may be substantially, cylindrical, but, said cylindrical roll R will be much more tight and consistently-rolled along its length than if the tarp bar were not present. Thus, the tarp bar may serve as a furling control member that improves the quality and consistency of the furling process.

The cam effect may be described as rotation of the tarp roll in incremental, partial-rotations that are created by the corners 80 of the non-circular roll. The drive bar rotation tends to tighten the material of the pre-roll PR further around the drive bar, as it works to cause the first rotation (first partial rotation) after the pre-roll initially "falls" into the tarp bar. Then, the drive bar rotation then tends to tighten the tarp material being rolled onto the intermediate roll IR before and during each incremental rotation occurs, with the tarp especially tightening generally before the roll flips over a corner to accomplish the partial rotation. The inventors have found that this cam effect works particularly well for up-hill rolling, and that a triangular shape or generally triangular shape is particularly effective. The drive bar tends to tension the tarp material along the entire length of the roll, and, during up-hill rolling, the weight of the combined roll unit 70 or the intermediate roll IR tends to increase said tension. The "flip" or "pivot" of the roll on each corner 80 tends to happen at the same time all along the length of the tarp roll, so that the tarp material tends to stay tight against the roll and the roll flips consistently and evenly. Thus, a tighter and more even roll results from the preferred tarp bar system and rolling process compared to the tarp system and rolling process not comprising the tarp bar.

FIGS. 20-26 illustrate some, but not the only, alternative tarp bars 91, 92, 93 that may be used in the apparatus and methods of FIGS. 1-19. Tarp bar 91 in FIGS. 20 and 23 has two tubular members connected by a curved connection member that include cut-outs along the length of the tarp bar to lighten the tarp bar. Tarp bar 92 in FIGS. 21 and 24 is a curved plate that is formed by rolling edges upward and slightly inward to form rounded edges. Tarp 93 in FIGS. 22 and 25 comprises a curved plate that is formed by rolling edges upward and inward to form nearly-tubular edges. One may note from these examples that the edges are rounded to prevent damage to the tarp material, and the curvature or rounded/curved edges create a cradle space 94, 95, 96 that will receive a pre-roll as discussed above for tarp bar 60. Yet other designs of tarp bars may be used, wherein the tarp bars preferably comprise the features of having a width greater than the diameter of the roll that the tarp bar is to receive, and of having edge surfaces that cradle, capture, and/or contain said roll between the edge surfaces. The tarp bars may comprise gaps, cut-outs, and/or hollow portions to reduce the weight of the tarp bar.

The tarp material may be various fabrics or sheets, as may be chosen by those of skill in the art. The power system and drive bar may be selected from ones already in the art, or may be adapted as desired. It will be understood after reading and viewing this document, that the preferred tarp bar system may improve the effectiveness of tarp rolling power and drive bar systems of a given size and power, thus, preventing the need for increased size, strength, and power of said power and drive bar systems to achieve good results. While the preferred tarp and tarp bar are applied to side-rolling tarp systems for trailers, tarp systems with tarp bars also may be adapted for use on truck beds and/or other apparatus needing a retractable cover, as will be understood by those of skill in the art.

Other embodiments of the invention will be apparent to one of skill in the art after reading this disclosure and viewing the drawings. Although this invention is described herein and in the drawings with reference to particular means, materials and embodiments, it is to be understood that the invention is not limited to these disclosed particulars, but extends instead to all equivalents within the broad scope of the following claims.

The invention claimed is:

1. A rolling tarp system comprising:
   a tarp having a distal edge and a distal portion near said distal edge, a proximal edge, and an intermediate portion between said distal portion and said proximal edge;
   a drive bar connected to the tarp at or near said distal edge of the tarp and powered to roll-up the tarp;
   a tarp bar generally parallel to said drive bar and connected to the tarp at a location on said intermediate portion of the tarp;
   wherein the distal portion of the tarp is adapted to be rolled up by the drive bar to form a first roll prior to said intermediate portion of the tarp being rolled up;
   said tarp bar having a longitudinal centerline and having a recess extending parallel to said longitudinal centerline, wherein said recess of the tarp bar receives said first roll when the drive bar rolls up the tarp to the location of the tarp bar on the tarp; and
   wherein said first roll and said tarp bar continue to roll as a combined unit, driven by the drive bar, to roll-up the tarp toward the proximal edge.

2. The tarp system as in claim 1, wherein said tarp has a length parallel to said drive bar and said tarp bar is rigid and extends all along the length of the tarp.

3. The tarp system as in claim 1, comprising no bar attached to said tarp between the drive bar and the proximal edge of the tarp except said tarp bar.

4. The tarp system as in claim 1 comprising only one tarp bar.

5. The tarp system as in claim 1, wherein said tarp bar comprises two elongated members each having a top surface and a bottom surface, and a plurality of connector members fixed to said bottom surface of each of said two elongated bars to space apart said two elongated members from each other and to rigidly fix said two elongated members relative to each other.

6. A rolling tarp system comprising:
   a tarp having a first edge and a second edge;
   a drive bar connected to the tarp at or near said first edge and adapted to roll-up the tarp from said first edge toward said second edge;
   a tarp bar generally parallel to said drive bar and connected to the tarp at a region between said drive bar and second edge, the tarp bar having a recess extending along its length;
   wherein the drive bar rolls up a portion of the tarp near said first edge into a pre-roll and, upon reaching the tarp bar, the pre-roll is received in said recess of the tarp bar to form a pre-roll plus tarp bar combination, said combination rolling as said drive bar continues to roll up the tarp toward the second edge so that a portion of the tarp near said second edge becomes wrapped around said combination.

7. The rolling tarp system as in claim 6, wherein said combination has a length parallel to the length of the drive bar and a transverse dimension perpendicular to said length of the combination, and wherein said combination is triangular in transverse cross-section.

8. The rolling tarp system of claim 6, wherein the tarp bar is a rigid bar comprising two elongated members and connector members spaced apart along the length of the two elongated members and rigidly fixing the two elongated members together in a single unit.

9. The rolling tarp system of claim 8, wherein said recess is a space between said two elongated members running the length of said two elongated members.

10. The rolling tarp system of claim 8, wherein said two elongated members are tubes and said connector members extend perpendicularly to the length of the tubes.

11. The rolling tarp system of claim 6, wherein said tarp bar comprises two elongated members each having a top surface and a bottom surface, and a plurality of connector members fixed to said bottom surface of each of said two elongated bars to space apart said two elongated members from each other and to rigidly fix said two elongated members relative to each other.

12. The rolling tarp system of claim 11, wherein said combination has a length parallel to the length of the drive bar and a transverse dimension perpendicular to said length of the combination, said combination is triangular in transverse cross-section, and said two elongated members form a first triangle corner and a second triangle corner, and an outer surface of said pre-roll forms a third triangle corner, of said transverse cross-section.

13. The rolling tarp system of claim 6, wherein:
said tarp bar has two longitudinal edges;
said combination has a length parallel to the length of the drive bar and a transverse dimension perpendicular to said length of the combination;
said combination is triangular in transverse cross-section; and said two longitudinal edges of the tarp bar are a first triangle corner and a second triangle corner of said triangular transverse cross-section; and
an outer surface of said pre-roll forms a third triangle corner of said triangular transverse cross-section.

14. The rolling tarp system of claim 13, wherein said pre-roll has a diameter, said tarp bar has a transverse dimension between said two longitudinal edges, and said tarp bar is greater in transverse dimension than said diameter of the pre-roll.

15. The rolling tarp system of claim 6, wherein said tarp bar is connected to the tarp at a location in the range of ⅕ to ¾ of the distance from said first edge to said second edge.

16. The rolling tarp system of claim 6, wherein said tarp bar is connected to the tarp at a location in the range of ⅕ to ½ of the distance from said first edge to said second edge.

17. The rolling tarp system of claim 6, wherein said tarp bar is not motorized.

18. The rolling tarp system of claim 6, further comprising a plurality of trailer bow members that are each bent at a bow corner to form a generally horizontal portion and a generally vertical portion, wherein said tarp rests on said bow members and rolls transverse to the bow members when being rolled up by the drive bar, said tarp bar being located at said bow corners when the tarp is unrolled.

19. The rolling tarp system of claim 18, wherein said tarp bar has two longitudinal edges and a transverse dimension between said two longitudinal edges, and wherein said transverse dimension is on said bow corners at approximately a 45 degree angle to horizontal when the tarp is unrolled.

20. A method of rolling up a side-rolling tarp system, said method comprising the steps of:
providing a tarp having a distal edge, a proximal edge, and a distal portion near said distal edge, a drive bar connected to the tarp at or near said distal edge, and a tarp bar having a length generally parallel to said drive bar and connected to the tarp between said drive bar and said proximal edge, the tarp bar having a recess extending along its length, wherein the tarp further has a middle portion extending from said tarp bar toward the proximal edge;
using the drive bar to roll up the tarp comprising rolling up the distal portion of the tarp into a pre-roll wherein, upon the pre-roll reaching the tarp bar, the pre-roll becomes cradled in said recess of the tarp bar to form a pre-roll-plus-tarp bar combination;
continuing to roll-up the tarp by rotating said combination toward the proximal edge wherein said rotating said combination wraps the middle portion of the tarp around said combination;
wherein said pre-roll becoming cradled in the tarp bar urges the pre-roll to be parallel to said length of the tarp bar.

21. The method of claim 20, wherein said pre-roll-plus-tarp bar combination is non-circular in transverse cross-section and said rotating the combination comprises a cam action of incremental, partial-rotations wherein said tarp wraps tighten on said combination prior to each incremental partial-rotation.

22. The method of claim 20, wherein:
said tarp bar has two longitudinal edges;
said combination has a length parallel to the length of the drive bar and a transverse dimension perpendicular to said length of the combination;
said pre-roll-plus-tarp bar combination is triangular in transverse cross-section, and said two longitudinal edges of the tarp bar form a first triangle corner and a second triangle corner of said triangular transverse cross-section; and
an outer surface of said pre-roll forms a third triangle corner of said triangular transverse cross-section;
so that said rotating the combination comprises a cam action comprising three incremental, partial-rotations corresponding to three sides of the triangular-cross-section combination.

23. The method of claim 22, wherein said cam action comprises said combination flipping over each of the first, second, and third triangle corners at the same time all along the length of the tarp roll, so that the tarp wraps stay tight on said combination.

* * * * *